UNITED STATES PATENT OFFICE.

GEORGE W. SAXTON, OF STERLING, KANSAS.

REMEDY FOR HOG-CHOLERA.

SPECIFICATION forming part of Letters Patent No. 324,418, dated August 18, 1885.

Application filed December 27, 1884. (No specimens.)

*To all whom it may concern:*

Be it known that I, GEORGE W. SAXTON, of Sterling, Rice county, Kansas, have invented a new and Improved Remedy for Hog-Cholera, of which the following is a full, clear, and exact description.

The object of my invention is to provide an improved composition of matter to be used as a preventive of and as a remedy for hog-cholera.

My improved remedy consists of the following ingredients, combined in about the proportion stated, to wit: alcohol, one (1) pint; oil of tar, one (1) pint; sulphuric acid, one-half ($\frac{1}{2}$) pint; carbolic acid, one-half ($\frac{1}{2}$) pint; tincture of iron, one-half ($\frac{1}{2}$) pint; turpentine, one-half ($\frac{1}{2}$) pint.

In mixing the above ingredients the oil of tar and the turpentine should first be thoroughly mingled with the alcohol, after which the others may be (together or separately) added, as desired.

In using the medicine for the treatment of hog-cholera, for which it is mainly designed, the dose will be from one (1) to three (3) small spoonfuls in milk or swill three (3) times each day, according to the intensity of the disease.

I prefer that sulphuric acid having a specific gravity of 1.843 be used in this composition, as I have found that the best results are obtainable with that degree of strength.

In hog-cholera the lungs of the animal are more or less affected, and I make use of the oil of tar because of its beneficial and soothing effect thereon.

Trichinæ and other parasitic worms abound in many cases, and the carbolic acid is used for its destructive effect upon such.

I am aware that each ingredient herein recited has been used for the purpose mentioned; but I am not aware that all of the ingredients of my composition have been used together.

Having thus described my invention, I claim as new and desire to secure by Letters Patent—

The herein-described composition of matter, to be used for the prevention and treatment of hog cholera, consisting of alcohol, oil of tar, sulphuric acid, carbolic acid, tincture of iron, and turpentine, in about the proportions specified.

In testimony whereof I affix my signature in presence of two witnesses.

GEORGE W. SAXTON.

Witnesses:
NATHANIEL DIXON,
HENRY D. ASHLEY.